UNITED STATES PATENT OFFICE.

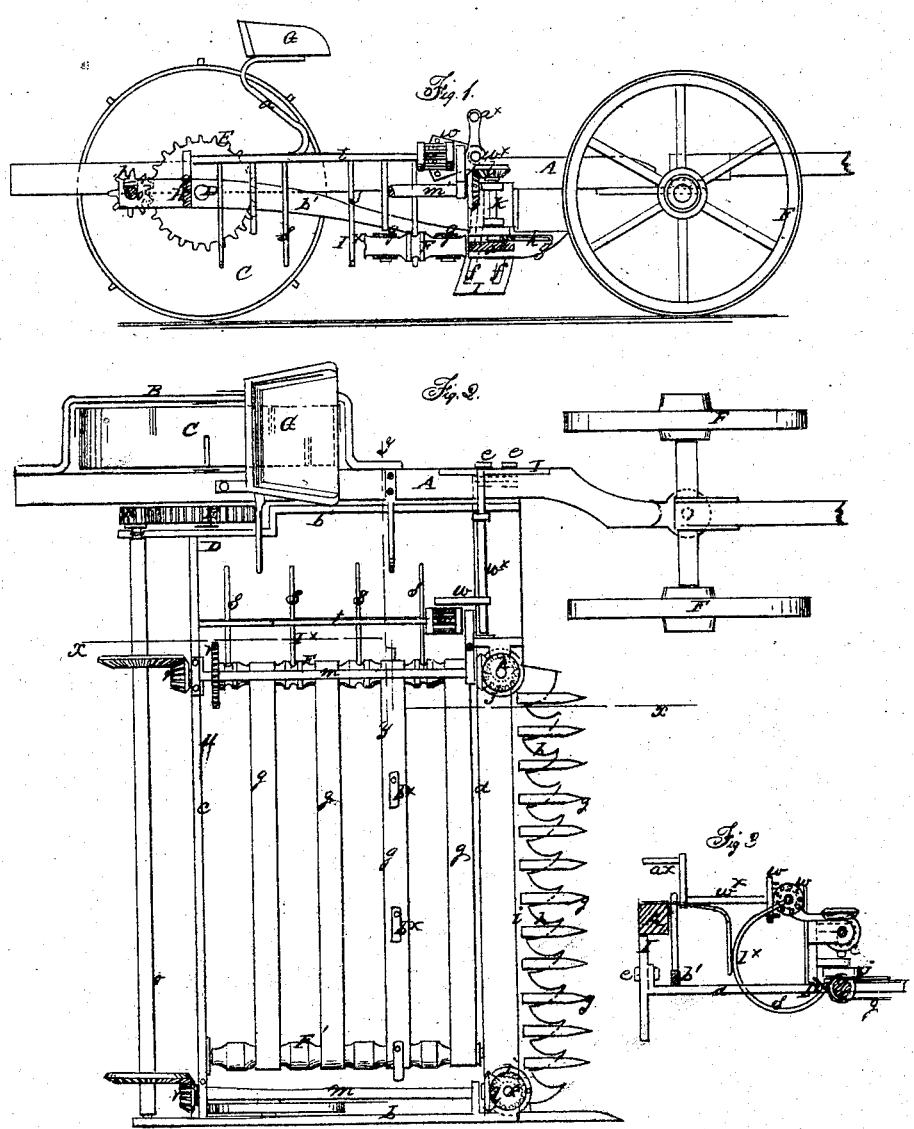

JAMES H. REDFIELD AND WALTER J. COX, OF SALEM, INDIANA.

IMPROVEMENT IN HARVESTERS.

Specification forming part of Letters Patent No. 74,847, dated February 25, 1868.

*To all whom it may concern:*

Be it known that we, JAMES H. REDFIELD and WALTER J. COX, of Salem, in the county of Washington and State of Indiana, have invented a new and Improved Mowing and Reaping Machine; and that the following description, taken in connection with the accompanying drawings, hereinafter referred to, forms a full and exact specification of the same, wherein we have set forth the nature and principles of our said improvements, by which our invention may be distinguished from all others of a similar class, together with such parts as we claim, and desire to have secured to us by Letters Patent.

This invention relates to a new and improved cutting apparatus, the same consisting of a series of hook-shaped teeth attached to or formed on a bar, the ends of which are attached to or connected with cranks or crank-pulleys which operate the tooth or sickle bar, so that each tooth of the bar will pass from the center of one guard or finger across the space and into the adjoining finger or guard, and, in thus moving, act with a drawing cut upon the grain or grass, cutting the same in a perfect manner and with a very moderate expenditure of power.

The invention further relates to a new and improved means for discharging the grain in gavels from the machine; and, further, in a peculiar manner of applying the frame which supports the cutting apparatus and grain-discharging device to the main frame, whereby the cutting apparatus may be adjusted higher or lower, as desired, with the greatest facility.

In the accompanying sheet of drawings, Figure 1 is a side sectional view of our invention, taken in the line $x\,x$, Fig. 2; Fig. 2, a plan or top view of the same; Fig. 3, a transverse section of a portion of the same, taken in the line $y\,y$, Fig. 2.

Similar letters of reference indicate like parts.

The main frame of the machine consists of a wooden bar, A, having a bent metal bar, B, attached to its left-hand side. Within this metal bar the driving-wheel C is placed, the axle D of which has one bearing in the bar B and the other in bar A, the axle projecting some distance through A, and having a toothed wheel, E, upon it. To the front end of the bar A a pair of truck-wheels, F, are attached by a king-bolt, as usual.

A driver's seat, G, is attached to curved supports $a\,a$, which are secured to the bars A B, said seat being directly over the driving-wheel C.

The frame H, which supports the cutting apparatus and grain-discharging device, is composed of two side bars, $b\,b'$, connected at their rear parts by a cross-bar, $c$, and at their front ends by a cross-bar, $d$. The side bar $b'$ of this frame H is by the side of the bar A of the main frame, and the axle D of the driving-wheel C passes through it; and the end of the front cross-bar $d$ of frame H extends underneath the bar A, and is curved upward a trifle to admit of two screw-bolts, $e$, passing through it, said bolts passing through curved slots $f\,f$ in a pendent plate, I, attached to bar A.

By this arrangement it will be seen that the front part of frame H may be adjusted higher or lower, as desired, the cross-bar $d$ being secured at any desired height by the screw-bolts $e$; and as the sickle works on the bar $d$, that also will be raised or lowered to cut at the desired height from the surface of the ground.

The bar $d$ has fingers or guards $g$ attached to it at suitable and equal distances apart. These fingers or guards may be of the usual slotted form for the teeth of the cutter-bar to work through. These teeth (designated by $h$) are of curved or hook form, as shown in Fig. 2, the cutting-edge being on the concave side.

The teeth $h$ may be made separately and attached to a bar, $i$, or they may be formed from or cut directly out of said bar $i$, the ends of the latter being connected to cranks or to crank-pulleys $j$ at the lower ends of vertical shafts $k\,k$, the upper ends of which are connected by gears $l$ with shafts $m\,m'$, the rear ends of the latter being connected by bevel-gears $n$ with a shaft, $o$, having a pinion, $p$, at one end, which gears into the wheel E on the axle D.

By this means the cutter-bar is operated as the machine is drawn along, the teeth being made to pass from the center of one finger or guard to the center of the one adjoining, the teeth crossing the spaces between the fingers or guards, and operating with a drawing cut, and then receding or passing back on bar $d$, and again moving forward into the fingers or guards adjoining, and receding as before, to again advance to their work.

The operation of the teeth is similar to that of the hand-movement of a sickle. The cut is an easy drawing one, and operates in the most efficient manner. The teeth are not liable to choke or clog, or be rendered inoperative in any manner, so long as they are kept in proper cutting order.

The cut grain falls upon a series of parallel endless bands, $q$, which pass over rollers F F' at the sides of the frame H, the inner roller F being connected by gears $r$ with the inner shaft $m'$.

By this means motion is given the bands $q$, and the latter convey the cut grain to a receiver, $I^x$, composed of a series of curved wires or rods, $s$, the upper ends of which are attached to a shaft, $t$, one end of which is provided with a pinion, $u$, into which a curved segment, $w$, gears, said segment being attached to a shaft, $w^x$, having a crank, $a^x$, at its end, which is operated by the foot of the driver. The cut grain is forced or deposited into this receptacle by springs or elastic plates $b^x$ attached to the band $q$. These plates $b^x$, as they pass around the inner roller F, are turned over toward the receptacle, and force the cut grain into it. Whenever a sufficient quantity of grain has been deposited into this receptacle, the driver, by pressing against the crank $a^x$ of the shaft $w$, throws up the rods $s$, and thereby discharges the gavel.

Having thus described our invention, we claim as new and desire to secure by Letters Patent—

1. The cutter-bar $i$, provided with the curved teeth $h$, having their concave edges forming the cutters, in combination with the crank-pulleys $j$ upon the vertical shafts $k$, gears $l$, shafts $m$ $m'$, bevel-gears $n$, shaft $o$, pinion $p$, and gear-wheel E upon the axle D, all arranged to operate as herein described, for the purpose specified.

2. The endless bands $q$ $q$, when provided with the springs $b^x$, in combination with the gavel-receiver $I^x$, pinion $u$, curved segment $w$, shaft $w^x$, and crank $a^x$, all arranged and operating as described, for the purpose specified.

3. The application of springs or elastic plates $b^x$ to the endless bands $q$, for the purpose of discharging the cut grain into the grain-receptacle, substantially as set forth.

4. The pendent plate I, when provided with the curved slots $f$, in combination with the set-screw $e$, frame H, and bar A, all arranged and operating as described, for the purpose specified.

JAMES H. REDFIELD.
WALTER J. COX.

Witnesses:
MARION STANLEY,
J. W. BERRY.